Patented Dec. 10, 1940

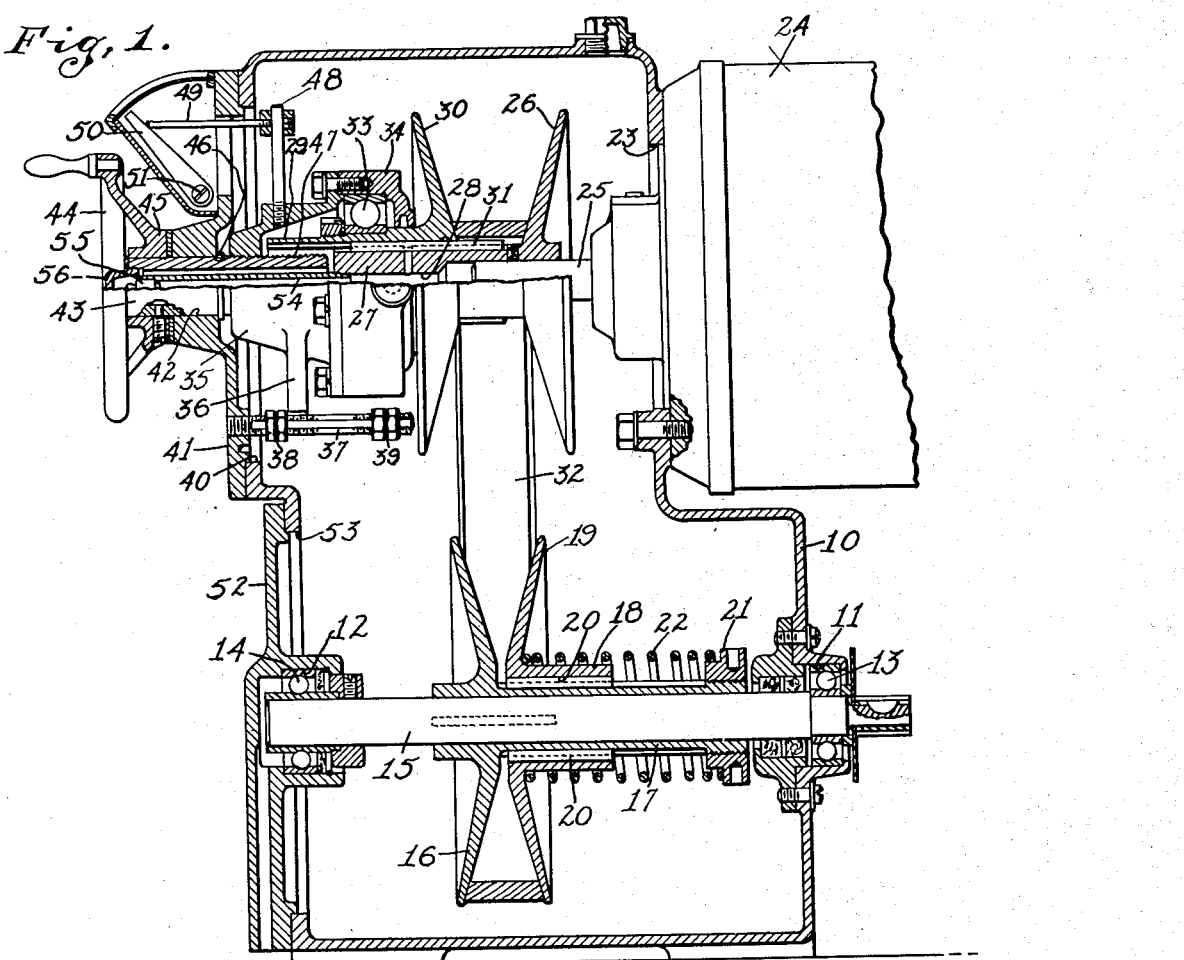

2,224,369

UNITED STATES PATENT OFFICE 2,224,369

ENCLOSED VARIABLE SPEED TRANSMISSION

Paul B. Reeves, Columbus, Ind., assignor to Reeves Pulley Company, Columbus, Ind., a corporation of Indiana Application August 31, 1934, Serial No. 742,228

21 Claims. (Cl. 74—230.17)

The present application relates broadly to variable speed transmissions, and more particularly to the enclosed type of such transmissions. Specifically, the invention is directed to means for axially shifting one of a pair of coned discs which cooperate to form an expansible V-pulley.

A primary object of the invention is to provide novel means for so shifting such a disc. A further important object of the invention is to provide, in an enclosed variable speed transmission, mechanism capable of positively shifting such a disc in both directions, all of such mechanism, and the disc itself, being hung on a closure plate forming a portion of one wall of the housing for such transmission, in such a way that removal of the closure plate extracts from the housing such disc, together with its operating mechanism; whereby the endless belt forming a part of the transmission may readily be removed or replaced. Further objects of the invention will appear as the description proceeds.

To the accomplishment of the above and related objects, my invention may be embodied in the forms illustrated in the accompanying drawing, attention being called to the fact, however, that the drawing is illustrative only, and that change may be made in the specific constructions illustrated and described, so long as the scope of the appended claims is not violated.

Fig. 1 is a sectional view of an enclosed variable speed transmission constructed in accordance with the present invention, and Fig. 2 is a fragmentary section through a modified form of the invention.

Referring more particularly to the embodiment illustrated in Fig. 1, it will be seen that I have illustrated a housing 10 formed with a pair of aligned apertures 11 and 12 in which are received roller bearings 13 and 14 respectively. A shaft 15 is journaled in said bearings; and, within the housing, said shaft carries a coned disc 16 having an elongated hub 17. Upon said hub there is slidably mounted the hub 18 of a second coned disc 19, said hub 18 being held against rotation with respect to the hub 17, by keys 20. At the extremity of the hub 17 farthest from the disc 16, there is secured an element 21 forming an abutment for one end of a coiled spring 22, the opposite end of which bears against the disc 19 to urge said disc 19 toward the disc 16. It will be seen that the discs 16 and 19 cooperate to form a resiliently expansible V-pulley.

The housing 10 is formed with an aperture 23 in one wall, said aperture being closed by the end frame of a motor 24, secured in place outside the housing. The spindle 25 of said motor is thus positioned within the housing and a coned disc 26 is fixed on said spindle 25. Said disc 26 is provided with an elongated hub 27 which, as is clearly shown in Fig. 1, is formed with a bore 28 extending throughout the length thereof. The hub 29 of a further coned disc 30 is slidably mounted on said hub 27, being held against rotation with respect thereto by one or more keys 31. It will be seen that the discs 26 and 30 cooperate to form an expansible V-pulley; and an edge-active belt 32 provides a driving connection between the pulley formed by the discs 26 and 30 and the pulley formed by the discs 16 and 19.

Fixed on the hub 29 of the disc 30 is a thrust bearing, indicated generally by the reference numeral 33. Said bearing comprises one element 34 which is not intended to rotate with the disc. Secured to said element 34 is a member 35 having a projecting finger 36 which, at its free end, is provided with furcations which straddle a rod 37, whereby the member 35, and consequently the element 34, are held against rotation. Stop nuts 38 and 39 are adjustably positioned on the rod 37 to limit the axial movement of the member 35.

It will be readily perceived that axial movement of the member 35 will be transmitted through the element 34 and the bearing 33 to the disc 30.

Opposite the aperture 23, the housing 10 is formed with a larger aperture 40 which is adapted to be closed by a closure plate 41. It will be seen that the dimensions of the aperture 40 are sufficiently large to permit passage therethrough of the disc 30. The rod 37 is carried by the plate 41.

Substantially centrally, the plate 41 is formed with an aperture 42 in which is journaled a member 43 which, at its outer end, projects outwardly beyond the plate 41 and carries a hand wheel 44, the hub 45 of which engages a surface of the plate 41. The wheel 44, being rigidly fixed to the member 43, will prevent inward movement of said member. A snap ring 46 carried in a groove in the member 43 engages the inner surface of the plate 41, and holds said member 43 against outward movement. The inner end portion of the member 43 is threaded, as at 47, for threaded engagement with the member 35.

It will be clear that the member 43 comprises a screw which is rotatably, but nonreciprocably, carried by the plate 41; and rotation of which, in opposite directions, will effect positive axial movement, in opposite directions, of the member 35, bearing 33, and disc 30.

In the drawing, the parts are shown in positions such that the effective diameter of the pulley formed by discs 28 and 30 is a minimum; while the effective diameter of the pulley formed by the discs 18 and 19 is a maximum. If the hand wheel 44 is now rotated in a direction such as to move the disc 30 toward the disc 26, the belt 32 will be forced outwardly between the discs, whereby the effective diameter of the pulley formed by the discs 26 and 30 will be increased. Such movement of the belt will force the belt inwardly into the space between the discs 18 and 19, thereby forcing the disc 19 to move toward the right, against the pressure of the spring 22. Opposite movement of the disc 30 will permit the belt to move inwardly into the groove between the discs 26 and 30; and the spring 22 will force the disc 19 toward the disc 18 to take up the resultant slack in the belt.

The member 35 carries a post 48 upon which is mounted a finger 49 engaging an indicator needle 50 mounted for oscillation upon a pivot 51. In the illustrated embodiment, spring means (not shown) is provided for constantly urging the free end of the needle 50, toward the right as viewed in Fig. 1. As the member 35 is moved toward the right, the spring correspondingly moves the needle 50; and as the member 35 is moved toward the left, the finger 49 forces the indicator 50 to move toward the left.

The bearing 14 may, if desired, be mounted as shown in a socket in a plate 52 which closes an aperture 53 in a wall of the housing 10.

Preferably, a tube 54 is engaged in the left-hand end of the hub 27, and carries at its outer end a lubricating fitting 55, access to which may be had by removing the cap 56. Oil or grease may be forced through the fitting 55 and tube 54 into the bore 28, from which ports lead, for instance, to the keyways, and/or to other parts of the organization which require lubrication.

It will be seen that, when the plate 41 is removed, the disc 30, together with all of the elements which enter into the positive shifting of said disc, will be extracted from the housing through the aperture 40. Thereafter, the belt 32 may readily be removed over the end of the hub 27, dropped out of engagement with the pulley formed by the discs 18 and 19, and removed from the housing through the aperture 53.

In Fig. 2, I have illustrated a modified form of the invention in which the housing 60 is formed with an aperture 61 closed by the end plate of a motor 62, the spindle 63 of which is positioned within the housing 60, and carries a disc 64, fixed on said spindle, and having an elongated hub 65 upon which the hub 66 of a disc 67 is mounted. The disc 67 is axially but nonrotatably movable with respect to the disc 64, being held against such rotation by one or more keys 68. An edge-active belt 69, illustrated in Fig. 2, is similar to the belt 32.

A thrust bearing indicated generally at 70 includes a nonrotatable element 71 with which is engaged a lever 72 pivoted, as at 73, on an extension 74 carried by the plate 75 which, at times, closes the aperture 76. A link 77 is pivoted, as at 78, to the end of the lever 72 remote from the pivot point 73; and said link is formed with a threaded bore 79 in which is engaged a screw 80, journaled in the plate 75 and carrying, without the housing, a hand wheel 81.

It will be seen that rotation of the screw 80 in opposite directions will operate, through the link 77, lever 72, element 71 and bearing 70, to shift the disc 67 toward or away from the disc 64.

Rigidly secured to the lever 72 is an element 82 which is connected, through a link 83, with an arm 84 of a bell crank lever pivoted at 86 on the plate 75. The opposite arm 85 of said bell crank lever comprises an indicator needle; and it will be obvious that, as the lever 72 is swung, the indicator 85 will be correspondingly moved.

A screw closure 87, coaxial with the spindle 63, closes an aperture in the plate 75 through which access may be had to a greasing fitting 88 leading into the bore 89 formed in the hub 65.

It will be clear that, when the plate 75 is removed, the disc 67, together with all of the elements which cooperate in the axial shifting of said disc, will be extracted from the housing 60, whereby the belt 69 may be removed from the housing in the manner above described.

By the term "thrust bearing," as used in the present specification and in the claims appended hereto, I mean a bearing of such character as to transmit axial forces positively in either direction. Thus, the bearings 33 and 70 of Figs. 1 and 2, respectively, each comprise an inner race positively held against relative axial movement in either direction with respect to its associated disc, an outer race, a series of balls snugly received in annular grooves in the respective race members, whereby said race members and balls cooperate to lock the race members against relative axial movement, and a casing element positively held against axial movement in either direction with respect to the outer race member.

I claim as my invention:

1. In a device of the class described, a housing, a shaft positioned in said housing, a coned disc fixed on said shaft and having an elongated hub, a second coned disc slidably but non-rotatably mounted on said hub, a removable plate forming a portion of the wall of said housing adjacent said second disc, a thrust bearing operatively associated with said second disc, and means cooperating with said bearing and operable to shift said second disc in opposite directions with respect to said first disc, said last-named means being secured to said plate whereby, upon removal of said plate, said second disc and said bearing are extracted from said housing.

2. In a device of the class described, a housing, a shaft positioned in said housing, a disc fixed on said shaft and having a coned face, a second disc coaxial with said shaft and slidable but non-rotatable with respect thereto, said second disc having a coned face presented toward the coned face of said first disc, and said second disc being located wholly on the coned side of said first disc, a thrust bearing operatively associated with said second disc, means holding one element of said bearing against rotation, a removable plate forming a portion of one wall of said housing and formed with an aperture therein, and a screw journalled in said aperture and held against axial movement, said screw being threadedly associated with said one element of said bearing for shifting the same in opposite directions, whereby, when said plate is removed, said screw, bearing and second disc are extracted from said housing.

3. In a device of the class described, a housing, a shaft positioned in said housing, a coned disc fixed on said shaft, a second coned disc coaxial with said shaft and slidable but non-rotatable with respect thereto, a thrust bearing operatively associated with said second disc, means holding one element of said bearing against rotation, a removable plate forming a portion of one wall of said housing and formed with an aperture therein, coaxial with said shaft, and a screw journalled in said aperture and held against axial movement, said screw being threadedly associated with said one element of said bearing for shifting the same in opposite directions, whereby, when said plate is removed, said screw, bearing and second disc are extracted from said housing.

4. In a device of the class described, a housing, a shaft positioned in said housing, a coned disc fixed on said shaft, a second coned disc coaxial with said shaft and axially movable but non-rotatable with respect thereto, said second disc being located wholly on one side of said first disc, a thrust bearing operatively associated with said second disc, a removable plate forming a portion of one wall of said housing, and a screw rotatably but non-reciprocably carried by said plate and operatively associated with an element of said bearing to shift said bearing and said second disc axially in opposite directions, whereby, when said plate is removed, said screw, bearing, and second disc are extracted from said housing.

5. In a device of the class described, a housing, a shaft positioned in said housing, a coned disc fixed on said shaft, a second coned disc coaxial with said shaft and axially movable but non-rotatable with respect thereto, a thrust bearing operatively associated with said second disc, a removable plate forming a portion of one wall of said housing, a lever pivotally mounted on said plate within said housing and operatively engaging an element of said bearing, whereby swinging movement of said lever in opposite directions shifts said bearing and said second disc axially in opposite directions, and a screw rotatably but non-reciprocably carried by said plate and operatively associated with a free end of said lever, whereby rotation of said screw swings said lever end, and whereby removal of said plate extracts said screw, lever, bearing, and second disc from said housing.

6. In a device of the class described, a housing, a shaft journalled in said housing, a coned disc fixed on said shaft, a second coned disc coaxial with said first disc and axially movable but non-rotatable with respect to said first disc, spring means urging said second disc toward said first disc, said discs cooperating to form a resiliently expansible V-pulley, a second shaft positioned in said housing, a coned disc fixed on said second shaft, a further coned disc coaxial with said last-named disc and axially movable but non-rotatable with respect thereto, said last-named discs cooperating to form a V-pulley, an edge-active belt providing a driving connection between said two V-pulleys, a removable plate forming a portion of the wall of said housing adjacent said last-named pulley, and means secured to said plate and to said last-named axially movable disc and operable to shift said last-named disc axially in opposite directions with respect to its fellow, said last-named disc being located between said belt and said plate whereby removal of said plate extracts said last-named axially movable disc from said housing without disturbing said belt.

7. In a device of the class described, a housing, a shaft journalled in said housing, a coned disc fixed on said shaft, a second coned disc coaxial with said first disc and axially movable but non-rotatable with respect to said first disc, spring means urging said second disc toward said first disc, said discs cooperating to form a resiliently expansible V-pulley, a second shaft positioned in said housing, a coned disc fixed on said second shaft, a further coned disc coaxial with said last-named disc and axially movable but non-rotatable with respect thereto, said last-named discs cooperating to form a V-pulley, an edge-active belt providing a driving connection between said two V-pulleys, a removable plate forming a portion of the wall of said housing adjacent said last-named pulley, and means coaxial with said second shaft and secured to said plate and to said last-named axially movable disc and operable to shift said last-named disc axially in opposite directions with respect to its fellow, whereby removal of said plate extracts said last-named axially movable disc from said housing.

8. In combination, a shaft, a resiliently expansible V-pulley on said shaft, a second shaft parallel with said first shaft, a coned disc fixed on said second shaft, a second coned disc coaxial with said first disc and axially movable but non-rotatable with respect to said first disc, said discs cooperating to form an expansible V-pulley, an edge-active belt providing a driving connection between said V-pulleys, a thrust bearing associated with said second disc and axially movable in opposite directions to shift said second disc positively in corresponding directions, means holding one element of said bearing against rotation, and a screw coaxial with said second shaft and threadedly associated with said one element of said bearing.

9. In combination, a shaft, a resiliently expansible V-pulley on said shaft, a second shaft parallel with said first shaft, a coned disc fixed on said second shaft, a second coned disc coaxial with said first disc and axially movable but non-rotatable with respect thereto, said discs cooperating to form an expansible V-pulley, an edge-active belt providing a driving connection between said V-pulleys, and a screw coaxial with said second shaft and rotatable but non-reciprocable with respect thereto, said screw being operatively associated with said second disc whereby rotation of said screw in opposite directions shifts said second disc axially in opposite directions.

10. In a variable-speed transmission, two parallel shafts, an expansible V-pulley mounted on each of said shafts, a one-piece endless V-belt operatively connecting said pulleys, a housing enclosing said pulleys and belt, said housing being formed with an aperture concentric with one of said pulleys and large enough to permit passage therethrough of said one pulley, a cover plate for said aperture, a non-rotatable member within said housing non-reciprocably associated with an element of said one pulley, and means carried on said cover plate and operable from outside said housing to reciprocate said member to expand or contract said one pulley.

11. In a variable-speed transmission, two parallel shafts, an expansible V-pulley mounted on each of said shafts, a one-piece endless V-belt operatively connecting said pulleys, a housing enclosing said pulleys and belt, said housing being formed with an aperture concentric with one of said pulleys and large enough to permit passage therethrough of said one pulley, a cover plate for said aperture, a non-rotatable member within said housing non-reciprocably associated with an element of said one pulley, and means operable from outside said housing to reciprocate said member to expand or contract said one pulley, said operating means being carried on and necessarily removable with said cover plate, whereby removal of said cover plate extracts said member and said pulley element from said housing.

12. In a device of the class described, a shaft, a coned disc fixed on said shaft, a second coned disc coaxially facing said first coned disc and axially shiftable but non-rotatable with respect thereto, a housing enclosing said discs, said housing being formed with an aperture concentric with said shiftable disc and large enough to permit passage thereof, a cover plate for said aperture, a non-rotatable member within said housing non-reciprocably associated with said shiftable disc, means operable from outside said housing for shifting said member and shiftable disc, and position-indicating means outside said housing and operable by movement of said member to indicate the current position of said shiftable disc.

13. In a device of the class described, a shaft, a coned disc fixed on said shaft, a second coned disc coaxially facing said first coned disc and axially shiftable but non-rotatable with respect thereto, a housing enclosing said discs, said housing being formed with an aperture concentric with said shiftable disc and large enough to permit passage thereof, a cover plate for said aperture, a non-rotatable member within said housing non-reciprocably associated with said shiftable disc, means operable from outside said housing for shifting said member and shiftable disc, and position-indicating means mounted on said cover plate outside said housing and operable upon movement of said shiftable disc to indicate the current position of said shiftable disc.

14. In a device of the class described, a shaft, a coned disc fixed on said shaft, a second coned disc coaxially facing said first coned disc and axially shiftable but non-rotatable with respect thereto, a housing enclosing said discs, said housing being formed with an aperture concentric with said shiftable disc and large enough to permit passage thereof, a cover plate for said aperture, a non-rotatable member within said housing non-reciprocably associated with said shiftable disc, means operable from outside said housing for shifting said member and shiftable disc, position-indicating means outside said housing, and an element carried on said member and operatively engageable with said indicating means to effect movement thereof in response to movement of said member.

15. In a device of the class described, a shaft, a coned disc fixed on said shaft, a second coned disc coaxially facing said first disc, axially shiftable with respect thereto, and located wholly on one side thereof, an inner bearing race secured against axial movement with respect to said second disc, an outer bearing race surrounding said first bearing race, a series of antifriction members received between said races and cooperating therewith to prevent relative axial movement of said races, a casing element enclosing said bearing races and held against axial movement with respect to said outer race, means engaging said casing element to hold the same against rotation, and screw means threadedly engaging said casing element and rotatable to effect axial movement of said casing element, bearing, and shiftable disc positively in either direction.

16. In a device of the class described, a shaft, a coned disc fixed on said shaft, a second coned disc coaxially facing said first disc and axially shiftable with respect thereto, an inner bearing race secured against axial movement with respect to said second disc, an outer bearing race surrounding said first bearing race, a series of antifriction members received between said races and cooperating therewith to prevent relative axial movement of said races, a casing element enclosing said bearing races, and held against axial movement with respect to said outer race, a housing enclosing all of such mechanism and formed with an aperture large enough to pass said shiftable disc, a cover plate closing said aperture, means carried by said cover plate and engaging said casing element to hold the same against rotation, and a screw, rotatably but non-reciprocably mounted in said cover plate coaxial with said casing element, and threadedly engaging the latter.

17. In a device of the class described, a shaft, a coned disc fixed on said shaft, a second coned disc coaxially facing said first disc and axially shiftable with respect thereto, a thrust bearing comprising an inner element axially fixed with respect to said shiftable disc and an outer element axially fixed with respect to said inner element, said bearing elements being relatively rotatable, means holding said outer bearing element against rotation, and screw means concentrically associated with said outer bearing element and rotatable to effect axial movement of said bearing and shiftable disc positively in either direction.

18. In a device of the class described, a shaft, a coned disc fixed on said shaft, a second coned disc coaxially facing said first disc and axially shiftable with respect thereto, a thrust bearing comprising an inner element axially fixed with respect to said shiftable disc and an outer element axially fixed with respect to said inner element, said bearing elements being relatively rotatable, a housing enclosing all of such mechanism and formed with an aperture large enough to pass said shiftable disc, a cover plate closing said aperture, means carried by said cover plate and engaging said outer bearing element to hold the same against rotation, and a screw rotatably but non-reciprocably mounted in said cover plate coaxial with said outer bearing element, and threadedly engaging the latter.

19. In a device of the class described, a shaft, a coned disc fixed on said shaft, a second coned disc coaxially facing said first disc and axially shiftable with respect thereto, a thrust bearing comprising an inner element axially fixed with respect to said shiftable disc and an outer element axially fixed with respect to said inner element, said bearing elements being relatively rotatable, a housing enclosing all of such mechanism and formed with an aperture large enough to pass said shiftable disc, a cover plate closing said aperture, a lever pivotally mounted within said housing upon said plate and engaging said outer bearing element, and screw means carried by said plate and operatively engaging said lever whereby rotation of said screw means effects swinging movement of said lever and axial movement of said bearing and shiftable disc positively in either direction.

20. In a variable speed transmission, two parallel shafts, an expansible V-pulley mounted on each of said shafts, a one-piece endless V-belt operatively connecting said pulleys, a housing enclosing said pulleys and belt, said housing being formed with an aperture large enough to permit passage therethrough of said one pulley, a cover plate for said aperture, a non-rotatable member within said housing non-reciprocably associated with an element of said one pulley, and means carried on said cover plate and operable from outside said housing to reciprocate said member to expand or contract said one pulley.

21. In a device of the character described, the combination with a shaft carrying variable diameter transmission pulley comprising a coned disc fixed on said shaft and a mating coned disc axially shiftable with respect to its fellow, of a stationary part provided with a bore substantially coaxial with said pulley, an adjusting member angularly fixed with said stationary part and axially fixed with respect to said shiftable disc, a control member engaged in said bore for angular movement, thrust bearing means fixing said control member axially of said bore, and motion converting means operative between said adjusting and control member for axially adjusting said adjusting member and said shiftable disc in response to angular movement of said control member.

PAUL B. REEVES.